April 17, 1934. T. W. KENYON 1,955,502
BOAT SPEEDOMETER
Filed April 25, 1930 3 Sheets-Sheet 1

INVENTOR
Theodore W. Kenyon,
BY
his ATTORNEY.

April 17, 1934.  T. W. KENYON  1,955,502
BOAT SPEEDOMETER
Filed April 25, 1930    3 Sheets-Sheet 2
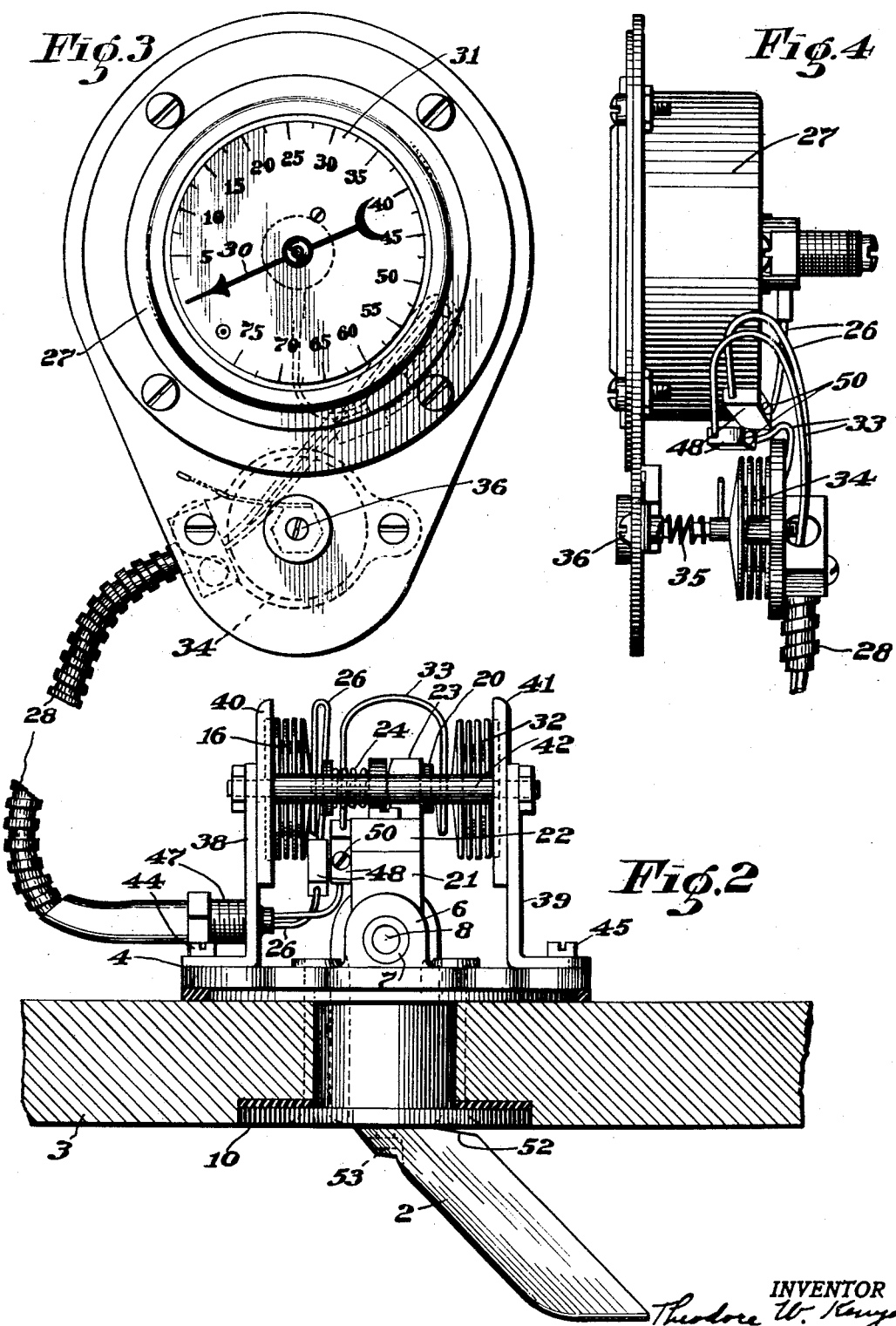
INVENTOR
Theodore W. Kenyon,
BY
J. H. McCready,
his ATTORNEY.

April 17, 1934. T. W. KENYON 1,955,502
BOAT SPEEDOMETER
Filed April 25, 1930 3 Sheets-Sheet 3
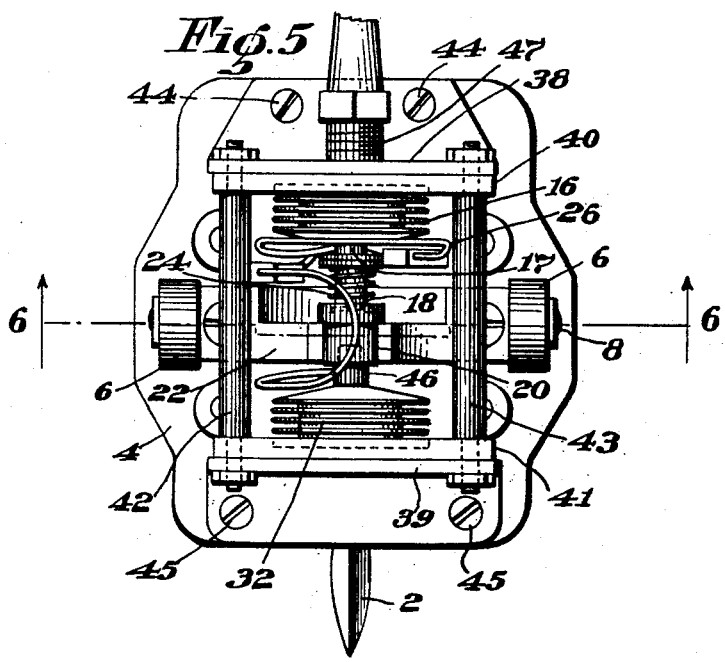
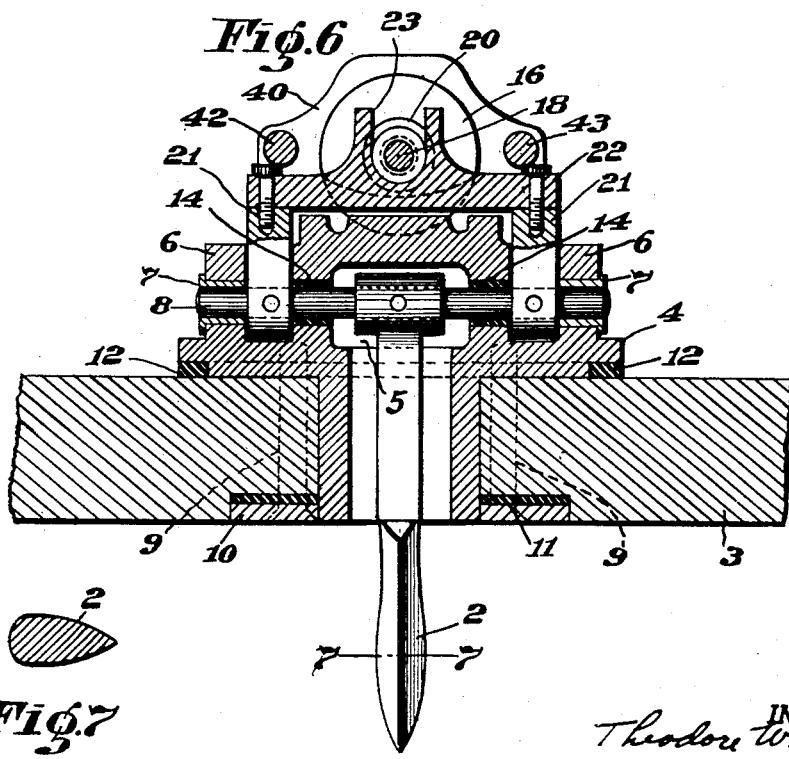
INVENTOR
Theodore W. Kenyon
BY
ATTORNEY.

Patented Apr. 17, 1934

1,955,502

UNITED STATES PATENT OFFICE 1,955,502

BOAT SPEEDOMETER

Theodore W. Kenyon, Brookline, Mass., assignor to Kenyon Instrument Corporation, Boston, Mass., a corporation of Massachusetts Application April 25, 1930, Serial No. 447,382

8 Claims. (Cl. 73—122)

This invention relates to instruments designed primarily for giving instantaneous indications of the speed of boats, although it is contemplated that essentially the same organization can be used for other purposes.

At the present time there is, so far as I am aware, no satisfactory instrument for this purpose. The most common method of indicating the speed of a motor boat is to use a tachometer for indicating the engine speed and to assume that certain engine speeds will produce designated boat speeds. This obviously is not a satisfactory arrangement. On sailing vessels the usual apparatus for determining speed consists of a spinning log of some type trailed astern of the boat. By noting the distance indicated by the log in a measured length of time the speed can be calculated.

The present invention aims to devise a speedometer which can be used on either motor or sail boats and to provide a construction which will be rugged, sturdy, and reliable, while still having a relatively high degree of accuracy.

The nature of the invention will be readily understood from the following description when read in connection with the accompanying drawings, and the novel features will be particularly pointed out in the appended claims.

In the drawings,

Fig. 2 is a sectional view, partly in elevation, showing the operating mechanism of an instrument constructed in accordance with this invention;

Fig. 3 is a front elevation of a gage or indicator suitable for use with the mechanism shown in Fig. 2;

Fig. 4 is a side elevation, partly broken away, of the device shown in Fig. 3;

Fig. 5 is a plan view of the mechanism shown in Fig. 2;

Fig. 6 is a vertical sectional view approximately on the line 6—6, Fig. 5; and

Fig. 7 is a sectional view on the line 7—7, Fig. 6.

Figure 1:
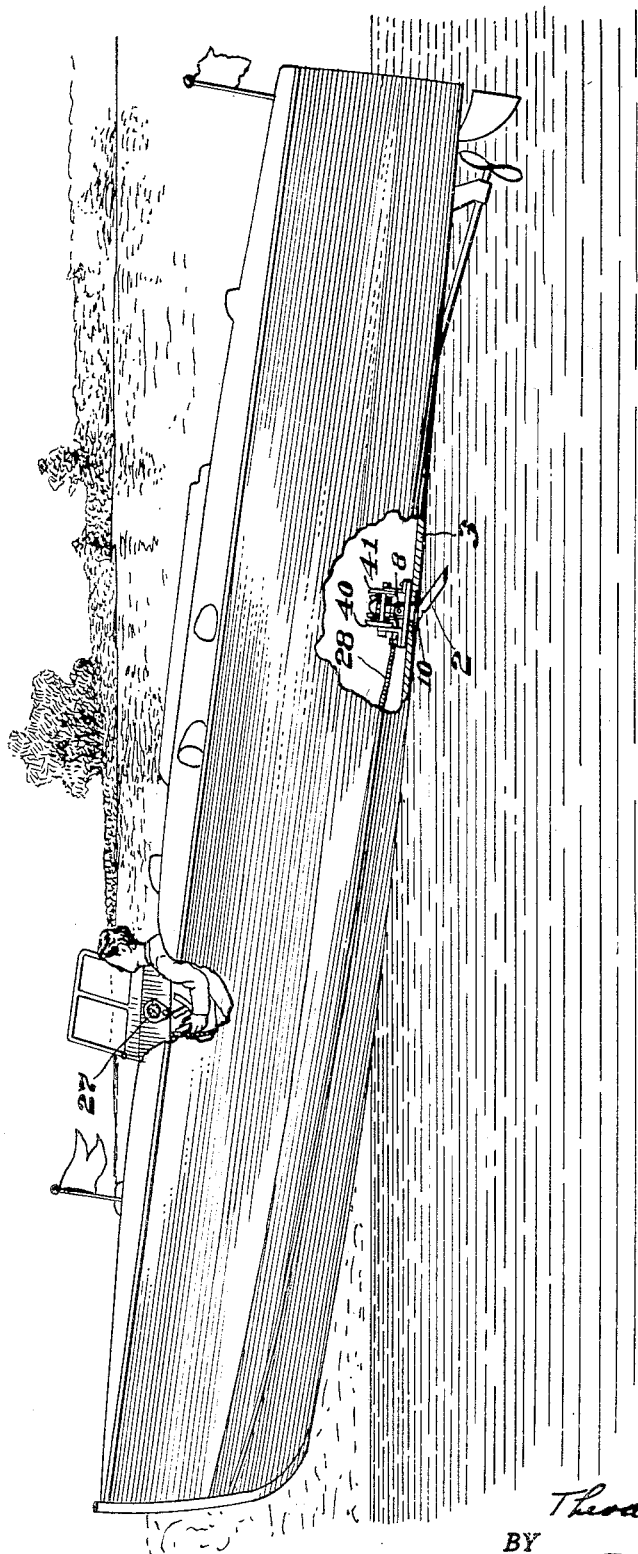
Figure 1 is a perspective view illustrating a typical installation embodying this invention.

The construction shown in the drawings comprises a vane or arm 2 which is designed to project into the water below the bottom 3 of the boat. Preferably this arm is of stream line form in cross-section, as shown in Fig. 7, and it is raked aft or inclined as shown in Figs. 1 and 2. The arm is supported by a base 4 having a chamber or socket 5, Fig. 6, in the lower side thereof to receive the upper end of the arm, the base being provided with bearings or trunnions 6—6 carrying bushings 7—7 supporting a rock shaft 8 to which the arm is pinned. The base is secured to the bottom 3 of the boat by screws 9—9, Fig. 6, the heads of which are supported in a plate 10 set into the bottom of the boat, while the shanks of the screws are threaded into the base 4. Gaskets or packings 11 and 12 preferably are used between the plate 10 and base 4, respectively, and the bottom 3 of the boat to prevent leakage around the base. Leakage of water through the base and around the shaft 8 is prevented by additional packings 14—14, Fig. 6, preferably consisting of tubes of highly resilient rubber such, for example, as plantation rubber, these tubes being held in the base under compression. This construction effectually excludes water while offering a negligible resistance to the slight rocking movement of the shaft 8.

It will be clear from an inspection of Figs. 1 and 2 that when the boat is moving forward the water will exert a pressure on the arm 2 tending to swing or deflect the arm backwardly. Since the pressure so produced will vary with, or be proportional to, the boat speed, the measure of such pressure can be utilized to indicate speed. If the arm is free to move and is held in position by a spring or some other yieldingly applied resistance, then the arm will be deflected by the pressure of the water against it, and since the degree of the deflection so produced will vary with, or be proportional to, the boat speed, a measure of such deflection can also be utilized to indicate speed.

It is contemplated that the pressure or the deflection of the arm can be measured in several ways. I have found it preferable, however, to utilize the variations in pressure exerted on the arm to create corresponding variations in pressure in a bellows or flexible fluid container and to measure these variations in a pressure gage graduated or calibrated for speed. This method of operation involves only extremely small movements or deflections of the arm, its position changing only very slightly for substantial changes in speed, and this fact greatly facilitates the elimination of errors due to the necessity of using packings to prevent leakage of water through the instrument. As shown in the drawings, a flexible metallic bellows 16, such as those used in thermostats and sensitive pressure responsive devices, is mounted above the base 4. The stem 17, Fig. 5, at the end of this bellows abuts against the head of a plunger 18, and the reduced shank of this plunger is guided in one end of a thrust member 20. Motion is transmitted from the arm 2 to the member 20 through the rock shaft 8 and a yoke which consists of two legs 21—21, Figs. 2 and 6, and a bar 22 secured to the upper ends of said legs. The legs of the yoke are pinned to the shaft 8 and the bar 22 is provided with an open sided socket 23, Fig. 6, to receive the thrust member 20. A spring 24 is coiled around the reduced shank of the plunger 18 and bears at one end against the head of this plunger and at its opposite end against the thrust member 20, said member being counterbored to receive one end of the spring. The spring 24 is placed in the instrument under compression so that the thrust member 20 is held firmly against the bar 22.

It will be evident from an inspection of Figs. 2, 5 and 6 that when the arm 2 is deflected rearwardly the bar 22 of the yoke will be moved forward, and that this movement will be transmitted through the spring 24 to the bellows 16, thus exerting a pressure on this bellows proportional to the degree of deflection of the arm. The arm 2 and the yoke 21—22 form a lever for operating the bellows. The spring 24 is provided simply for safety and is made so stiff that ordinarily the full movement of the bar 22 is transmitted to the bellows 16, the spring yielding only under an abnormal movement of such a degree that rupture of the bellows would be likely to occur if it were not for the presence of the spring.

The pressure created in the bellows 16 by the movement of the arm 2 is transmitted hydraulically to a gage 27 through a liquid contained in the bellows and in the tube 26 which connects the bellows with the gage. The tube runs through a protecting armor or cable 28. The pressure gage used may be of any suitable type such, for example, as the common constructions in which a Bourdon tube is used to operate a pointer. With this arrangement any movement of the arm 2 created by the pressure of the water thereagainst is not only transmitted positively to the gage, but such movement is multiplied by the mechanical leverage of the arm and yoke, by the action of the bellows on the transmitting liquid, and by the action of the gage itself. Consequently, a very small movement of the arm produces a greatly increased movement of the pointer 30 over the scale 31. Usually the scale is graduated in miles per hour but it may be calibrated or graduated in any other convenient units.

An instrument organized in the manner just described has ample accuracy to satisfy a great variety of uses. Due to the fact, however, that the instrument includes hydraulic means for referring the movement of the arm to the gage or indicator 27, and since this gage usually is mounted on an instrument board, as shown in Fig. 1, which is several feet higher than the bellows 16, a certain error in the readings of the gage is introduced by the hydrostatic pressure in the transmission means.

In order to compensate for this error, the instrument shown is equipped with a second bellows 32, Figs. 2 and 5, like the bellows 16, and arranged directly in line with it. A tube 33 is connected with this bellows and runs through the cable 28 to another bellows 34, Fig. 4, mounted just below the gage 27. These two bellows 32 and 34 and the tube 33 are filled with liquid so that the hydrostatic pressure created in them is substantially equal to that in the hydraulic transmission mechanism and one counterbalances the other. In other words, these two hydraulic systems are hydrostatically balanced at the member 20 and bar 22, one system only, however, being used in the transmission of pressure from the arm 2 to the indicator or gage 27.

The chief function of the latter bellows is to afford a convenient means for adjusting the zero setting of the needle. For this reason a spring 35, Fig. 4, is arranged to bear against the bellows 34 and is backed up by a screw 36, the head of which is exposed at the front of the instrument. By turning this screw, pressure which is adjustable in degree, is applied to the bellows 34, thus acting through the bellows 32, thrust member 20, and bellows 16 to adjust the needle 30. In other words, this adjustment can be used to change the pressure relationship of the two hydraulic systems, one to the other. This adjustment is rarely needed but is useful in making the initial setting and sometimes also in compensating for changes in temperature.

It is preferable both from a standpoint of installing the apparatus and also in making repairs to be able to remove the bellows easily from the base 4. This is conveniently accomplished in the instrument shown by supporting both bellows 16 and 32 in a frame which is detachably mounted on the base. The frame consists of two brackets 38 and 39, Figs. 2 and 5, carrying end plates 40 and 41, respectively, these brackets and their end plates being secured together by two shouldered spacing rods 42 and 43 and nuts threaded on the ends of these rods. Two screws 44—44 secure the bracket 38 to the base 4 while similar screws 45—45 fasten the bracket 39 to the base. Each of the end plates is recessed to receive the end of its respective bellows, and the end post 46, Fig. 5, of the bellows 32 is set into a socket in the thrust member 20. This arrangement, with the connections between the adjacent ends of the two bellows 16 and 32, serves to hold them in alinement with each other independently of the bar 22. The lower end of the cable 28 is equipped with a fitting 47, Fig. 2, by means of which it is fastened to the bracket 38. It will be evident, therefore, that by removing the screws 44 and 45, the entire frame with the bellows and the cable 28 can be removed as a unit from the base 4, the thrust member 20 slipping freely out of the socket 23 in the bar 22 during such removal. The entire unit can also be quickly remounted on the base when desired.

The tubes 26 and 33 may consist of suitable lengths of small copper tubing readily obtainable on the market and having an outside diameter of, say, one-sixteenth of an inch. While the size of the tubes used has no material effect upon the operation of the device, small tubing is desirable since it minimizes the effects of temperature variations and gives a smoother action due to the fact that the viscous drag of the liquid dampens minor fluctuations of the gage. These tubes may be soldered directly to a properly designed port in the base of the bellows, or for convenience the ends of the tubes may be soldered into connectors consisting of blocks 48 suitably drilled to receive them, and each block may have a screw threaded hole communicating with the holes in which the ends of the tubes are inserted, the threaded holes being closed by screw threaded plugs 50.

A great variety of liquids may be used in the bellows and the tubes connected with them. It is preferable, however, to use a liquid having a low freezing point and a low coefficient of expansion. A mixture of ethylene glycol and water is very satisfactory for this purpose. In addition to having the properties just mentioned, it is of such a viscosity as to cause a rapid response of the gage to changes in pressure while producing a sufficient dampening effect to eliminate minor vibrations, thus giving a steady reading of the gage.

The invention thus provides a boat speedometer which is comparatively simple in organization, is relatively inexpensive to manufacture and install, and is adapted for use on a wide variety of craft. Where a fairly high degree of accuracy is required, it is preferable to use the compensating arrangement above described, but the instrument is sufficiently accurate for a great many uses without such a compensating apparatus. Due to the fact that only the arm 2 projects below the bottom of the boat into the water, the instrument offers an extremely small resistance to the forward movement of the boat. The entire organization is of relatively rugged construction so that it is not likely to get out of order. The bellows used may be one of the copper constructions very widely used in thermostats, and the pressures created in them and in the transmission system are such that gages designed to handle substantial pressures, such as twenty to fifty pounds for example, can be used. Such an instrument is not only accurate at relatively high speeds but also at very low speeds. Furthermore, such an instrument is not affected seriously by the rolling, pitching, or yawing of the boat. If the hydrostatic compensation arrangement is used the effect of these movements upon the gage is entirely negligible.

The arm 2 may strike some floating object but being rugged is not likely to be damaged by such contact unless the conditions are such as to cause material damage to parts of the boat as well. Injury to the parts of the instrument other than the arm due to this cause is guarded against by providing the arm with a shoulder 52, Fig. 2, which is adapted to strike the lower edge of the sleeve-like projection extending downwardly from the main body of the base through the hull 3 of the boat, such engagement serving to limit positively the rearward movement of the arm. It is also entirely feasible to make the arm in two pieces, the inclined portion being removably secured to the shank by a screw 53, Fig. 2. By inclining the arm aft, as shown in Fig. 2, it is practically impossible for it to collect weeds or similar material. It is entirely possible also to use other means for applying pressures to the bellows 16 proportional to the speed of the boat.

While I have herein shown and described a preferred embodiment of my invention, it will be understood that the invention may be embodied in a considerable variety of forms without departing from the spirit or scope thereof.

Having thus described my invention, what I desire to claim as new is:

1. In a boat speedometer, the combination of an arm adapted to project into the water, a base for supporting said arm, said base having a socket to receive the one end of the arm, a rock shaft on which said arm is secured, said shaft extending through the wall of said socket, a packing cooperating with said shaft to prevent leakage of water around it, an indicator graduated for speed, and means for transmitting the motion of said arm to said indicator.

2. A ship log for a boat having an aperture in the bottom thereof, of an arm projecting through said aperture, means including a base secured on said bottom and supporting said arm for pivotal movement fore and aft of the boat, packings associated with said base for preventing the leakage of water around said base, a pressure gage graduated for speed, a bellows, connections for transmitting the movement of said arm to said bellows to compress it to a degree varying with the deflection of the arm, and a tube connecting said bellows and gage together, said bellows and gage being filled with liquid whereby variations in pressure set up in said bellows will be indicated on said gage.

3. A ship log for a boat having an aperture in the bottom thereof, of an arm projecting through said aperture, means including a base secured on said bottom and supporting said arm for pivotal movement fore and aft of the boat, packings associated with said base for preventing the leakage of water around said base, a pressure gage graduated for speed, a bellows, means for removably supporting said bellows on said base, connections for transmitting the movement of said arm to said bellows, and a tube connecting said bellows and gage, the bellows and gage being filled with liquid, and said connections permitting the removal of said bellows and tube from said base.

4. In a boat speedometer, the combination of a base adapted for attachment to the bottom of a boat, a rock shaft, bearings carried by said base and supporting said rock shaft, an arm secured on said rock shaft to swing and adapted to project into the water, means associated with said base for preventing the water from coming through said base around said rock shaft from the outboard side of the base, a pressure gage, and apparatus for causing the swinging movement of said arm to operate said pressure gage including hydraulic means for transmitting pressure exerted on said arm to said gage.

5. In a boat speedometer, the combination of a base adapted for attachment to the bottom of a boat, a rock shaft, bearings carried by said base and supporting said rock shaft, an arm secured on said rock shaft to swing and adapted to project into the water, resilient packings encircling said rock shaft between said bearings and the outboard side of the base for preventing the water from coming through said base around said rock shaft, a pressure gage, and apparatus for causing the swinging movement of said arm to operate said pressure gage including hydraulic means for transmitting pressure exerted on said arm to said gage.

6. In a ship log for a boat hull having an aperture therethrough below the water level, an arm projecting through the aperture and outwardly beyond the hull and inclined in a rearward direction toward the stern of the boat, the arm having capacity for slight fore and aft movement due to the pressure of water as the hull moves therethrough, a pressure-responsive gauge suitably graduated for speed, a liquid transmission system for communicating the movements of the arm to the gauge mechanism having flexible diaphragms at opposite ends, means for operatively connecting the arm with the lower end of the transmission system, and means for completely sealing the transmission system and moving parts associated therewith from contact with water otherwise entering through the aperture in the hull.

7. In a ship log for a boat hull having an aperture formed therein below the water line and free from substantially protruding surfaces about the aperture, an arm projecting outwardly of the boat hull through the aperture and inclined rearwardly toward the stern, the arm having capacity for slight fore and aft movement by virtue of water pressure created by the passage of the hull therethrough, a pressure-responsive gauge, mechanism for communicating the movements of the arm to the gauge, and means for completely sealing the arm from the transmission mechanism to preclude passage of water thereto from the aperture in the hull.

8. In a ship log for a boat hull having an aperture therethrough below the water line, an arm projecting outwardly of the hull through the aperture and having capacity for slight fore and aft movements due to water pressure, a pressure-responsive gauge, means for transmitting motion from the arm to the gauge including a shaft connected to the arm and operated thereby and operative connections beyond the shaft, and means for completely sealing the shaft bearing and parts therebeyond from access to water entering through the aperture.

THEODORE W. KENYON.